United States Patent [19]
Kearns

[11] Patent Number: 6,033,070
[45] Date of Patent: Mar. 7, 2000

[54] VARIABLE FOCAL LENGTH LENS

[76] Inventor: John P. Kearns, 12005 Kerwood Rd., Silver Spring, Md. 20904

[21] Appl. No.: 09/212,813

[22] Filed: Dec. 16, 1998

[51] Int. Cl.[7] .................................. G02C 7/06; G02B 1/06
[52] U.S. Cl. .............................................. 351/168; 359/666
[58] Field of Search ..................................... 351/159, 161, 351/168–169; 359/676, 665, 666, 710

[56] References Cited

U.S. PATENT DOCUMENTS

| | | | |
|---|---|---|---|
| 2,269,905 | 1/1942 | Graham | 88/57 |
| 5,673,153 | 9/1997 | Soll et al. | 359/846 |
| 5,844,708 | 12/1998 | Anselment et al. | 359/210 |
| 5,956,183 | 9/1999 | Epstein | 359/666 |

OTHER PUBLICATIONS

Author: Robert Graham, Title: A Variable Focus Lens and Its Uses, Date: Nov. 1940, J.O.S.A., vol. 30, pp. 560 to 563.

*Primary Examiner*—Georgia Epps
*Assistant Examiner*—Jordan M. Schwartz

[57] ABSTRACT

A variable focal length lens, for use in spectacles, is capable of variable power and astigmatism. It includes two independently controlled elastic cylindrical lenses which are mounted in series, usually but not necessarily at right angles to each other, on a common stiff transparent support. The lenses are each deformed by a pair of edge forces normal to each outer surface. The forces produce an essentially cylindrical shape of each outer surface. The two pairs of forces are independently controlled by two knobs conveniently located on the temple of the spectacles.

8 Claims, 5 Drawing Sheets

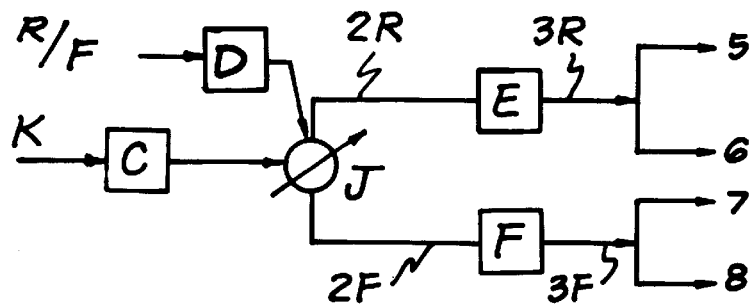
FIG. 1A
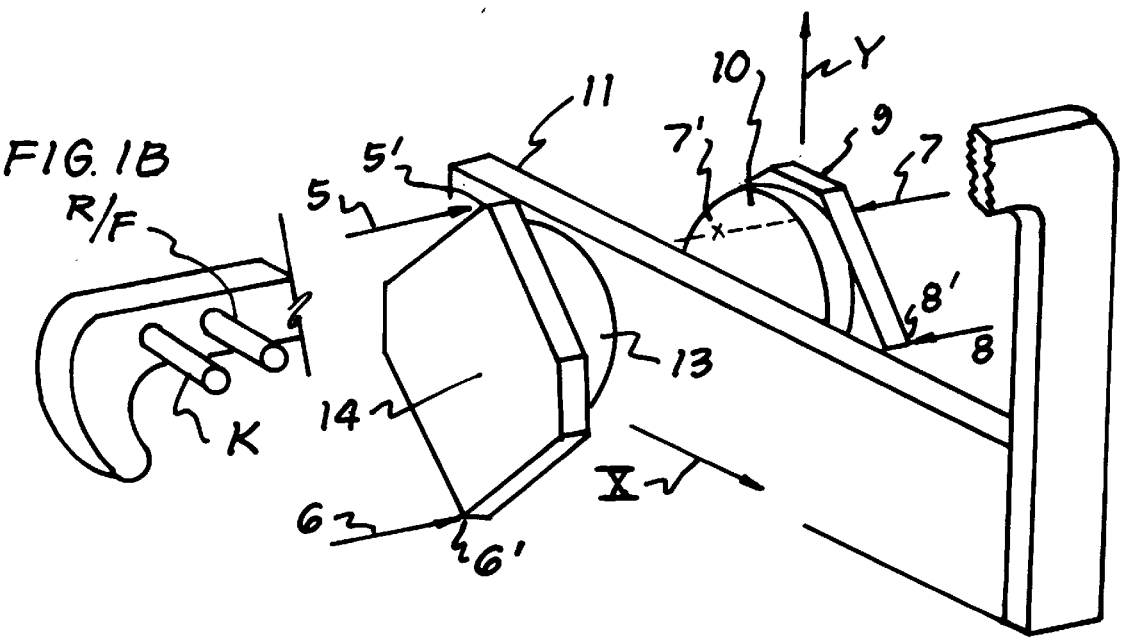
FIG. 1B
FIG. 1

VARIABLE FOCAL LENGTH LENS

BACKGROUND OF THE INVENTION

1. Field of Invention

This invention relates generally to optics. It relates particularly to spectacles and eyeglasses. It relates specifically to a variable focal length lens for use in spectacles.

2. Description of Related Art

With age a common problem is that of poor vision for reading. The problem is further complicated if the task is at arms length. For reading, bifocals are needed; for the task at arms length, trifocals are needed. The fields of view are then smaller, presenting annoying coordination problems between the angle of tilt and the center of attention. Going down steps is a problem. Some distance vision is needed, but the bifocal reading segment blurs the picture.

Variable focal length lenses provide an answer to the above problems. Usually they have a variable positive power and are used as additions to prescription lenses. Thus they may not need corrections for astigmatism. However, if variable astigmatism is provided in the lens, then in some cases it is possible to use the variable lens by itself without the presence of a prescription lens.

Variable focus lenses require that changes be produced in the curvatures of the surfaces of the lenses, or that changes be produced in the index of refraction of the optical medium in the interior of the lens. Usually the index of refraction is left constant and the curvatures of the surfaces are changed to provide a spherical power. Several examples of related art for spherical power lenses are given below, and then an example of an early invention of a lens having variable focus and astigmatism will be given.

In U.S. Pat. No. 3,598,479, by Wright a transparent wafer is cemented to the surface of a prescription lens, with a small cavity provided between the wafer and the lens. Provision is made for fluid to be injected into the cavity, deforming the wafer to create a positive power to be added to the power of the prescription lens.

In recent years U.S. Pat. No. 5,138,494, by Kurtin describes a variable focus lens which obtains its variable power by the use of a distensible membrane which is deformed by fluid pressure. The lens comprises the membrane, a supporting ring around the periphery, a glass disc behind the membrane, a cavity filled with fluid, and a rear glass that can provide the front face of a prescription lens; an elastic annular rubber ring serves to contain the liquid in the cavity, and permits the glass disc to move axially. Holes spaced around the periphery of the disc permit the compressed fluid in the cavity to flow into the space between the disc and the membrane, and thus distend the membrane into a spherical shape.

U.S. Pat. No. 5,371,629, provides a non-circular variable focus lens for cosmetic purposes. A non-circular ring supports the membrane around the periphery. A variable elasticity around the ring enables it to cause the membrane deflection under fluid pressure to take a spherical shape and thus produce a variable power. An added cylindrical power is suggested by further modification of the elastic properties of the ring.

The use of a membrane in these two inventions might meet with certain practical problems. The membrane may be easily damaged by small particles. It may be difficult to create uniform tensions in the boundary. The weight of the fluid in the cavity may change the curvature of the surface of the membrane. These are all factors which are difficult to assess. In any case It appears that the two inventions apply primarily to the control of spherical powers.

In U.S. Pat. No. 2,269,905, by Graham, crossed cylinders have been proposed. Variable positive power and astigmatism are achieved. A forward square glass wafer is given a cylindrical curvature by in-plane edge forces and moments applied to the opposite ends of the wafer. A rear square glass wafer is given its curvature by a separately controlled set of forces and moments. The cavity between the two glass wafers is filled with a transparent fluid. The two separately controlled curvatures permits the variable power and astigmatism to be achieved. In the fifty four years since the issuance of the patent, no lenses of this design have appeared on the market. It does seem that reasonably uniform curvature in the wafers would be difficult to achieve by the use of the distributed in-plane edge forces applied in compression to the opposite edges of the wafers. In the present invention to be described below, a completely different forcing system is used to produce reasonably uniform curvatures, and thus a more practical variable lens.

SUMMARY OF INVENTION

The goal for the useful variable lens is to devise a transparent elastic structure which, when simply loaded, will permit uniform curvatures to be achieved on the forward and aft faces of the lens. If the medium between the two faces has a uniform index of refraction, then a lens is created. If the curvatures are spherical, then the lens is useful for many cases for eyes free of astigmatism. It is difficult, however to load a thin elastic plate in such a way as to produce a uniform spherical curvature. It has been found that it is possible to load a properly shaped thin plate in such a way as to produce an approximately uniform cylindrical curvature. It is then possible to create a lens with two independently controlled thin plates with two independent cylindrical curvatures separated by an optical medium with a uniform index of refraction. If the plates are oriented so that the cylindrical axes are orthogonal, then the composite lens can be used to correct astigmatism in the eyes. A spherical lens is a special case in which the two cylindrical curvatures are approximately equal. The following description of the invention shows how these concepts can be implemented.

BRIEF DESCRIPTION OF THE DRAWINGS

FIG. 1 is a schematic diagram showing the variable focal length lens in its entirety, according to its present embodiment. In particular, FIG. 1A shows a block diagram which indicates how a control knob position leads to the creation of tip forces on one of the lens elements. FIG. 1B is a sketch of the major lens elements as supported on a simple frame with a temple to represent a spectacles.

DESCRIPTION OF THE PREFERRED EMBODIMENTS

Figure 2:
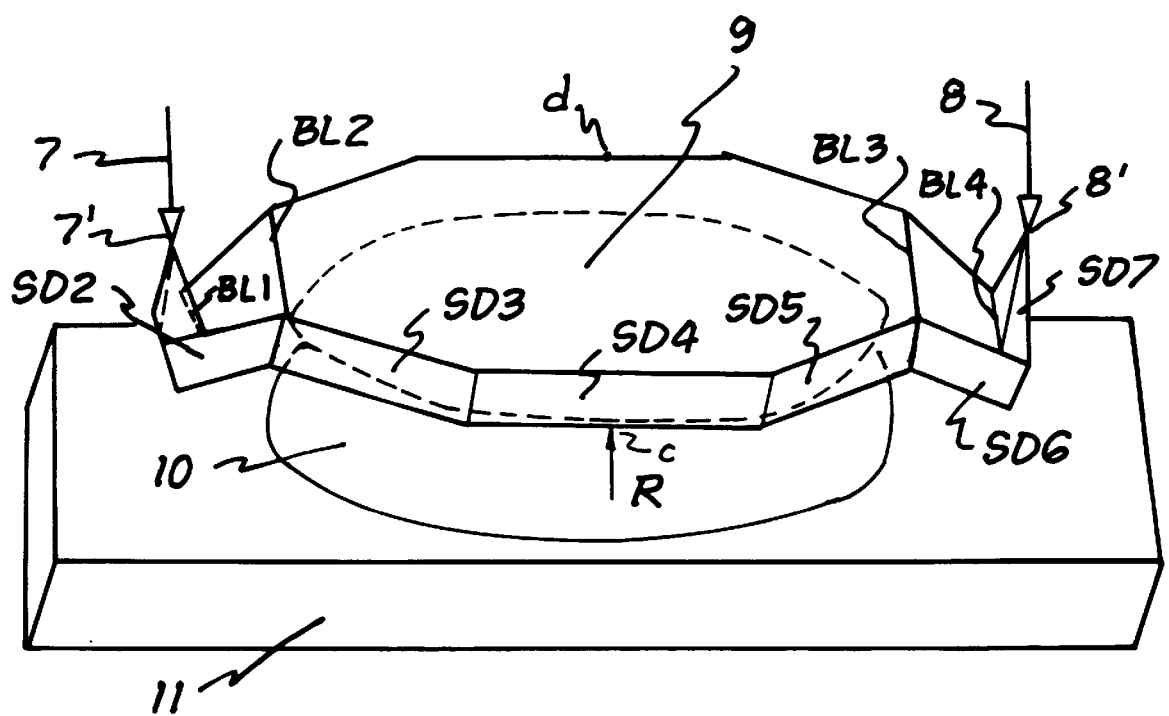
FIG. 2 is a sketch of the basic lens components.

A description of the complete lens is provided by reference to FIG. 1A and FIG. 1B. FIG. 1A shows a Force Delivery System, while FIG. 1B shows a Basic Component Arrangement. Control Knobs K and RIF are shown in both figures. Control Knob K represents the input position which ultimately produces tip forces 7 and 8 on the forward cylindrical lens, and tip forces 5 and 6 on the rear cylindrical lens. In FIG. 1A, the rotation of Knob K is converted in Block C to a pressure in Line 2. The rotation of Knob R/F is converted by Block D at Junction J to produce independent pressures in Lines 2R and 2F. The two pressures are each modified as needed in Blocks E and F to produce pressures in Lines 3R and 3F. The pressure in Line 3R is then applied to create forces 5 and 6 at points 5' and 6' as shown in FIG. 1B. These points are located on the lens item 14, which is next to the eye. Similarly, the pressure in Line 3F (FIG. 1A) produces forces 7 and 8 at points 7' and 8', FIG. 1B, which are located on lens item 9. Items 14 and 9 are also identified hereinafter as the outer thin elastic wafers. The forces applied to the tips of lens item 9 are opposed by reaction forces from lens item 10, which is also identified hereinafter as an interior elastic disc. The applied and reacting forces deform the wafer item 9 in a substantially cylindrical shape. A description of these forces will be presented later. The interior elastic disc comprises a hollow elastomeric pancake, filled with a transparent fluid. The one face of the pancake takes a cylindrical shape from the deformation of wafer 9. The other face of the pancake is bonded to item 11, which is a stiff flat transparent element. It retains a substantially flat shape when the external forces 7 and 8 are applied to wafer item 9. The assembly of items 9, 10 and 11 therefore provides a cylindrical lens, with one surface curved about Axis Y under load, and with the other surface flat.

In a similar manner the pressure in Line 3R in FIG. 1A produces forces 5 and 6 at points 5' and 6' in FIG. 1B. These forces produce a curvature in the thin elastic wafer shown as lens item 14. The wafer transmits the forces to the interior elastic disc 13 and thence to the flat stiff element 11. In this case the end result in that a cylindrical lens is created having curvature about the axis X. The total lens system thus comprises two crossed cylindrical lenses. The lenses are independently controlled, because the presence of the flat stiff common element prevents the forces on one lens from producing a deformation of the other lens.

Specific elements will now be described in detail.

1. Outer Thin Elastic Wafer

In FIG. 2 is shown a sketch of the elastic wafer 9, the interior elastic disc 10, and the flat stiff component 11. The following key design features are noted on the wafer. The wafer is here considered in the form of a modified square thin plastic. One corner and its opposite are clipped to produce face SD4 and its opposite. The faces SD3 and SD5 and their opposites are part of the original square. The other two corners of wafer 9 are bent down at bend lines BL2 and BL3. The two tips are then bent up at bend lines BL1 and BL4. The transverse forces 7 and 8 are applied at locations 7' and 8' on the bent up tips.

Figure 3:
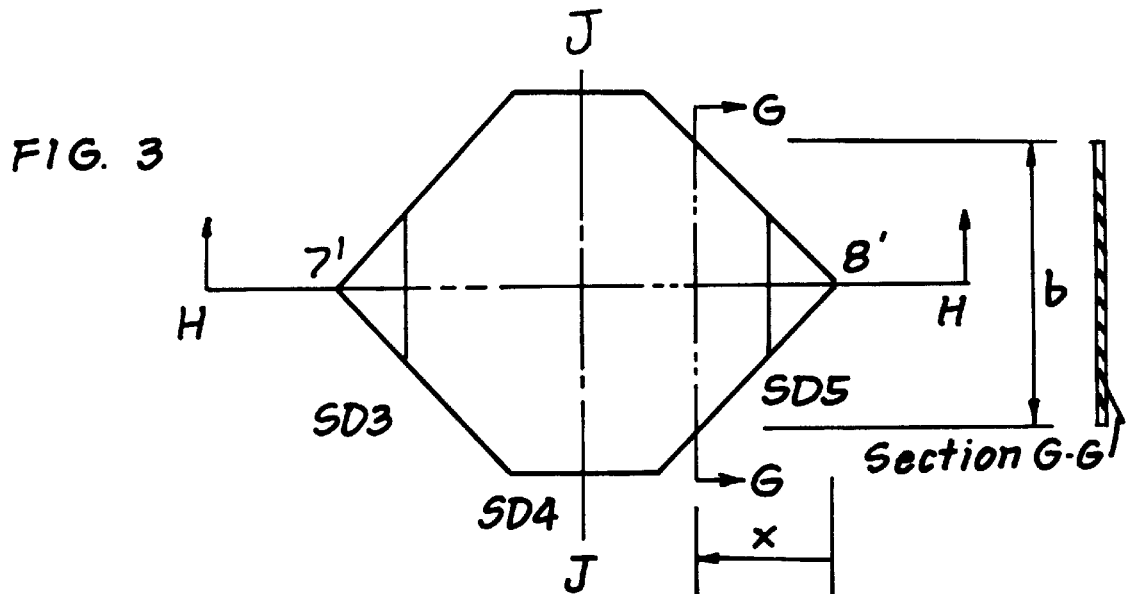
FIG. 3 is a top view of the outer thin elastic wafer, according to the present invention.

The overall intent of the wafer 9 design is to produce a useful approximation to a uniform curvature of the surface when two equal forces are applied to locations 7' and 8'. To achieve this result, a guiding concept from elementary cantilever beam theory is employed. The concept is that the applied bending moment at a structural section GG in FIG. 3 should be proportional to the bending rigidity. For a uniformly thin wafer, the bending rigidity is proportional to the width "b" of the Section GG of FIG. 3. The bending moment is the product of the applied force at location 8' and the lever arm "x". Thus if the dimension "b" varies uniformly with "x", so should the bending rigidity. However, since the corners have been clipped to produce the faces SD4 and the opposite face, the dimension "b" is constant in this region. The reason the faces are present is that so-called anticlastic curvatures are prevented. Such curvatures are concave, orthogonal to the desired spanwise convex curvatures under the applied forcing system. The anticlastic curvatures are further prevented by the bent tips at bend lines BL2 and BL3, (shown in FIG. 2) because the chordwise bending rigidity is increased in this region.

Additional complications are introduced by the reacting force system created by the elastic disc 10. If the reacting forces were distributed along a line JJ, in FIG. 3, then the guiding elementary beam concept would be fully implemented. The actual reaction force distribution of the elastic disc is much more complicated. Model tests have shown that a useful approximation to a uniform curvature of the surface of wafer 9 has been achieved. Further comments are provided in the discussion of the design of the interior elastic disc.

2. Interior Elastic Disc

Figure 4:
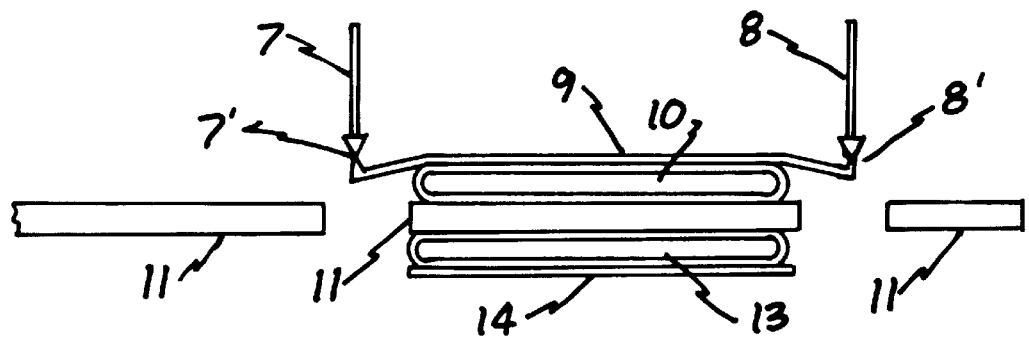
FIG. 4 is a cross-section of the wafer supported by a fluid filled elastic disc, which is in turn supported on a stiff transparent main support element.
Figure 5:
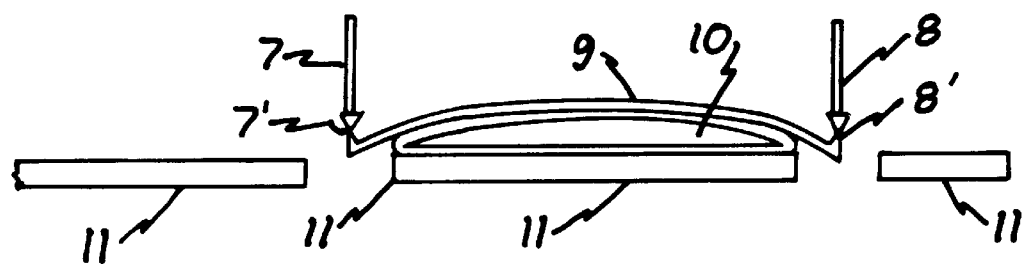
FIG. 5 shows the wafer deformed by tip forces to create a cylindrical lens element.
Figure 6:
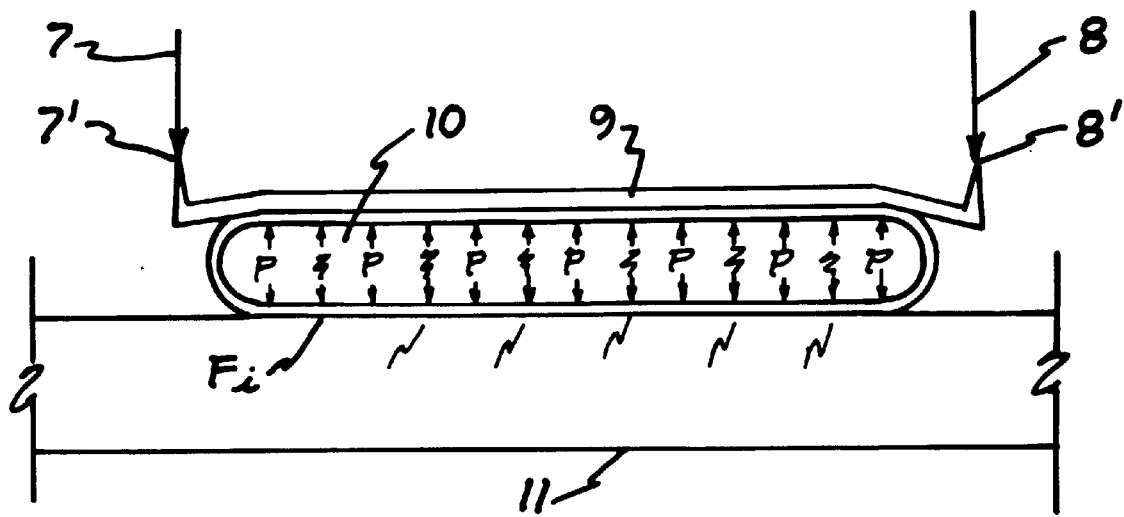
FIG. 6 shows the same cross-section with an identification of the major forces acting on the wafer.
Figure 7:
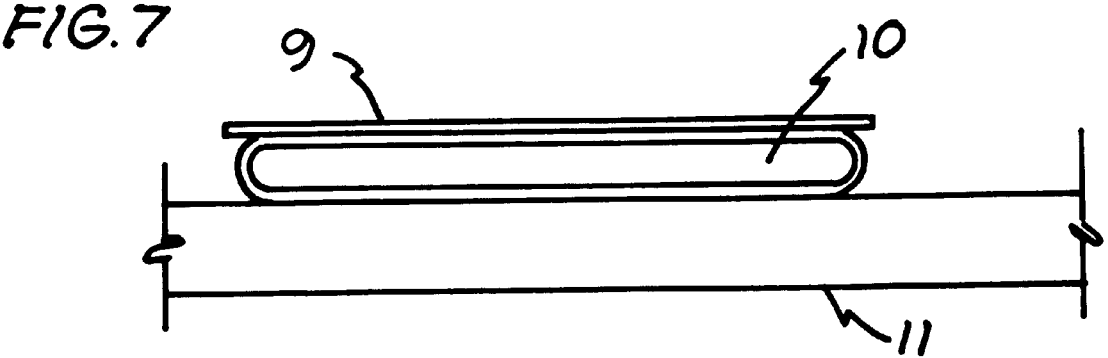
FIG. 7 shows one simple design of the rim of the interior elastic disc. I
Figure 8:
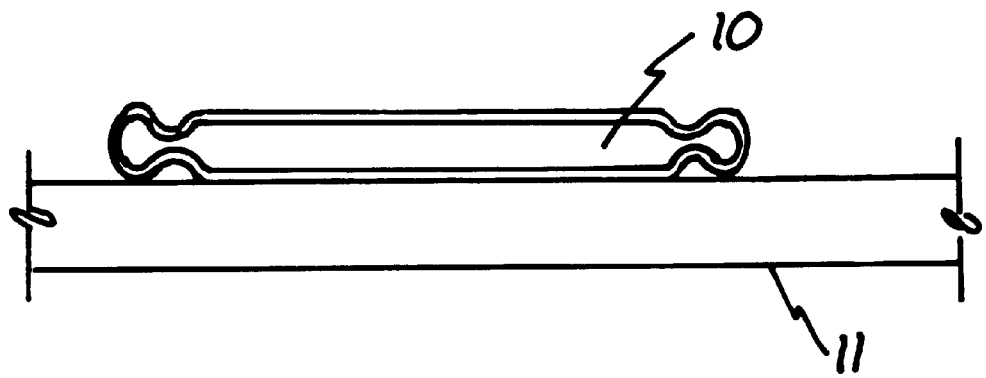
FIG. 8 shows a modified rim design for an increased flexibility to accommodate a larger volume of fluid at lower pressure.
Figure 9:
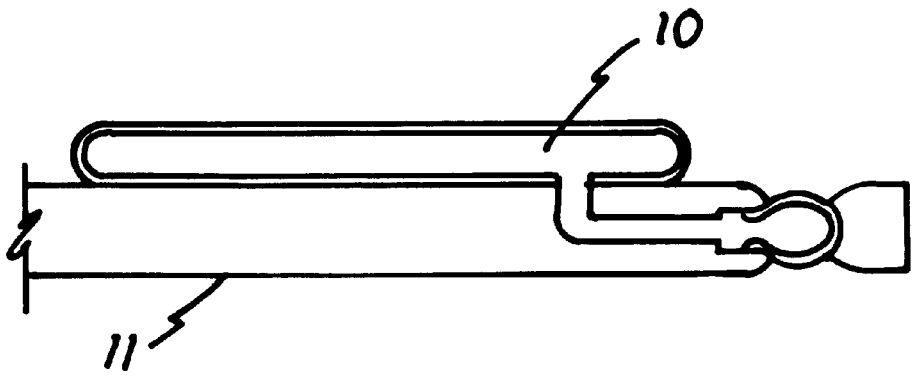
FIG. 9 shows another concept for a disc with a simple rim design. In this case a hole in the disc wall on the flat stiff component leads to a tunnel and an elastic sac to accommodate a large volume of fluid within the flat stiff component.

The interior elastic disc, Item 10 in FIGS. 1 through 6 is shown in its role of supporting the thin wafer 9. It comprises a hollow thin walled pancake, filled with a soft gel or silicone fluid. The upper surface of the disc supports wafer 9 while the lower surface is supported by the stiff flat transparent element 11. These three elements are shown in FIG. 4. Also shown in FIG. 4 are elements 13 and 14 which are the added elements needed to create the other cylindrical lens which are virtually identical to the elements 9 and 10 mentioned above. In FIG. 4 the wafer 9 is unloaded and is therefore flat. In FIG. 5 forces 7 and 8 are shown deforming the wafer 9 into the cylindrical shape, along with the upper surface of disc 10. The bottom surface of the disc remains flat, since it contacts the stiff flat element 11. With the fluid in disc 10, the three elements comprise one half of the elastic lens. In FIG. 6, the three elements are again depicted to show the presence of the pressure forces produced by the fluid on the under surface of the wafer. Spring forces are also present due to the portion of the elastic disc which does not contact either the wafer or the stiff element. This is the rim. Various rim designs are shown in FIGS. 7, 8 and 9. In FIG. 7 is the simple rim which has functioned well in models. In FIG. 8 is shown a design for a more flexible rim. More fluid can be moved in and out of the central volume with smaller pressure changes. The spring forces in the rim can then dominate and thus a closer approximation to a cylindrical curvature can be achieved. In FIG. 9 is shown how the same end result can be produced by means of a channel which serves to transfer fluid from the disc into the stiff support element into another elastic sac. Other disc designs may be helpful to attain better cylindrical wafer deformation. A varying rim stiffness around the disc periphery may be effective.

3. Flat Stiff Component

The flat stiff component, Item 11, is shown in FIG. 1 and FIG. 2, and in FIGS. 4 to 9 inclusive. It is a transparent plate which supports the forward and aft orthogonal cylindrical lenses. Its platform can be shaped to conform to a desired appearance for the spectacles. Its cross-section is shown in the figures. It further serves to provide substantially independent control of the powers of the two cylindrical lenses. This means that the application of control forces on one lens will not change the existing power of the other lens. The flat surface should not deform appreciably under the load applied to it by the interior elastic disc. Such a result can be achieved by requiring that the bending rigidity of the stiff component should be much higher than the bending rigidity of the outer thin elastic wafer. Many different structures can be employed for this purpose. As an example, consider a flat plastic sheet having a thickness of 0.10 inches. If the wafer has a thickness of 0.01 inches, there is a factor of 10 for the thickness ratio. The bending rigidity varies as the cube of the thickness; consequently the resulting stiffness ratio is of the order of 1000.0. Such a stiffness ratio should be more than adequate.

I claim:

1. A variable focal length lens, capable of variable spherical power and variable astigmatism which comprises: two cylindrical lenses, each one independently controlled to deform to provide a cylindrical power, or to alter the cylindrical power thereof, a first cylindrical lens consisting of three principal transparent components as follows: an outer thin elastic wafer, bonded to an interior elastic disc, the disc in turn bonded to a flat stiff component; a second independently controlled cylindrical lens of the same design, having the flat stiff component in common with the first cylindrical lens followed by two additional principal transparent components consisting of a second interior elastic disc, bonded to the other face of the flat stiff component, followed by a second outer thin elastic wafer, bonded to the second interior elastic disc, placed such that the cylindrical axis of the second outer thin elastic wafer is oriented at some angle relative to the cylindrical axis of the first cylindrical lens; a first independent force means acting on the first outer thin elastic wafer to deform the first cylindrical lens, and a second independent force means acting on the second outer thin elastic wafer to deform the second cylindrical lens; the end result being a complete variable focal length lens having both variable spherical power and variable astigmatism.

2. A variable focal length lens according to claim 1, wherein the outer thin elastic wafer has a platform and force means which minimize the undesirable anticlastic curvatures that is, those with an axis which is orthogonal to the axis of the desired cylindrical surface, as produced by the independent force means acting on the outer thin elastic wafer.

3. A variable focal length lens according to claim 2, wherein an outer thin elastic wafer is initially flat, consisting of a thin flat square of glass or plastic, modified to minimize anticlastic curvatures and thereby help to produce the desired close useful approximations to uniform cylindrical curvatures of the outer thin elastic wafer; said modifications to the wafer consisting first of a clipped pair of opposite corners which are not externally loaded, and second of a bent pair of the other opposite corners which are being loaded by the independent force means.

4. A variable focal length lens according to claim 1, wherein an outer thin elastic wafer consists of a thin glass or plastic, with a platform which has symmetry about two orthogonal reference axes through the center; such a platform being essential for the production of the desired curvatures of the wafer as deformed by the independent force means, applied in a normal direction to a pair of opposite edges of the wafer, which are located on one of the reference axes, the independent force means applied in such a way as to minimize local bending moments.

5. A variable focal length lens according to claim 1, wherein an interior elastic disc is bonded on one surface to the inner surface of the outer thin elastic wafer and bonded on the other surface to the flat stiff component; the interior elastic disc consisting of a hollow elastic thin walled elastomeric pancake, which encloses a transparent liquid or soft gel, the elastic disc having a stiffness characteristic such that the fluid pressure in the disc is both small and is minimally changed, as the disc is deformed by the independent force means.

6. A variable focal length lens according to claim 5, wherein the interior elastic disc is made with a normally uniform rim thickness, and with a normally uniform spring stiffness around the periphery of the disc.

7. A variable focal length lens according to claim 6, wherein the interior elastic disc additionally comprises several elastic sacs spaced around the outer surface of the interior elastic disc rim, the mouth of each sac extending through the rim enabling the sac to accept or emit fluid as needed to minimize pressure changes in the fluid-filled interior elastic disc.

8. A variable focal length lens according to claim 6, wherein the fluid-filled interior elastic disc has modified rim compressional stiffnesses around the periphery, such that when an independent force means is applied to the outer thin elastic wafer, an improved approximation to a single axis cylindrical curvature is achieved on the outer thin elastic wafer.

* * * * *